Dec. 29, 1942.    C. M. CONRADSON    2,306,379
HYDRAULIC POWER SYSTEM
Original Filed March 12, 1930    3 Sheets--Sheet 1
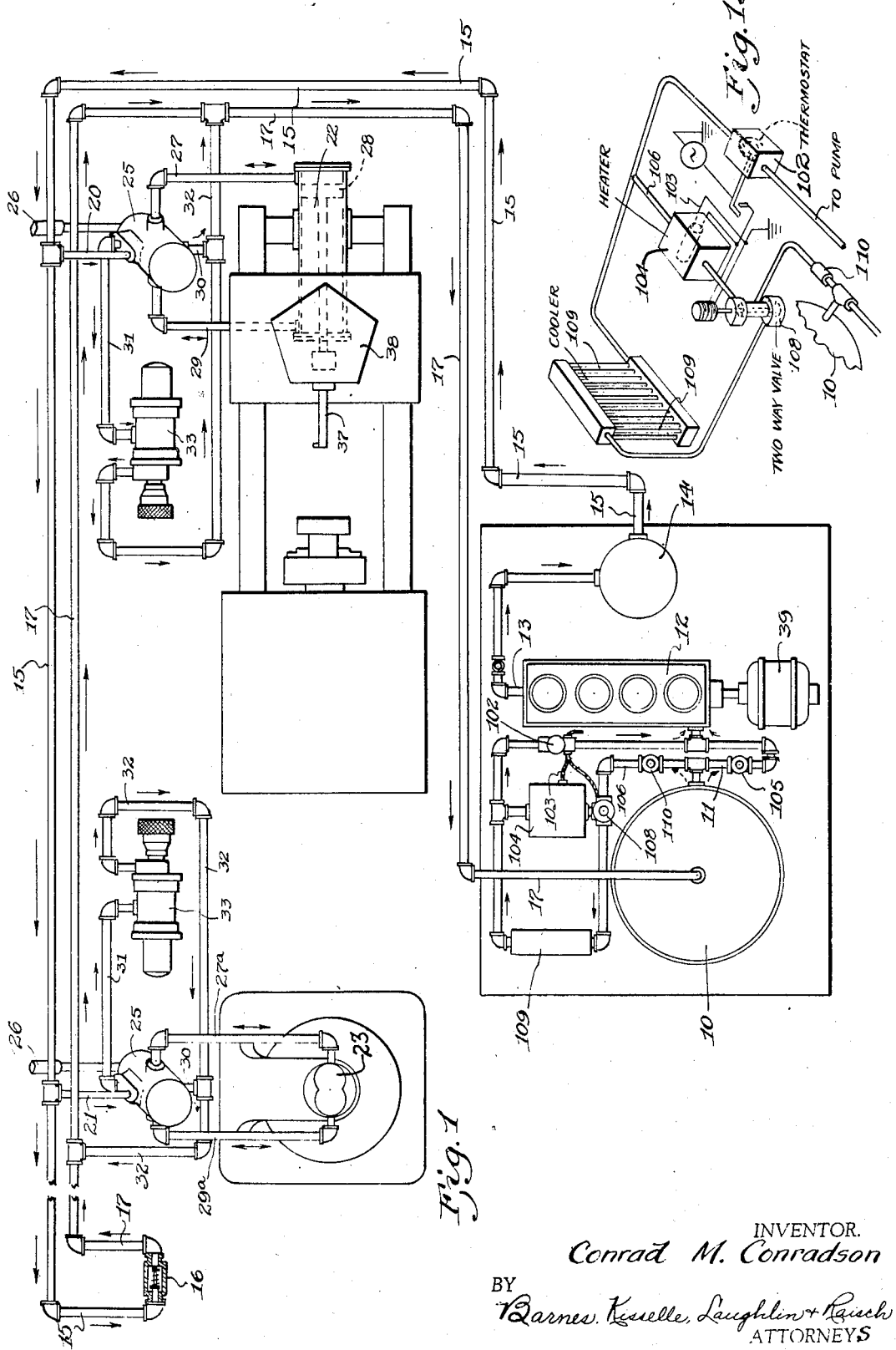
INVENTOR.
Conrad M. Conradson
BY
Barnes, Kisselle, Laughlin & Rausch
ATTORNEYS

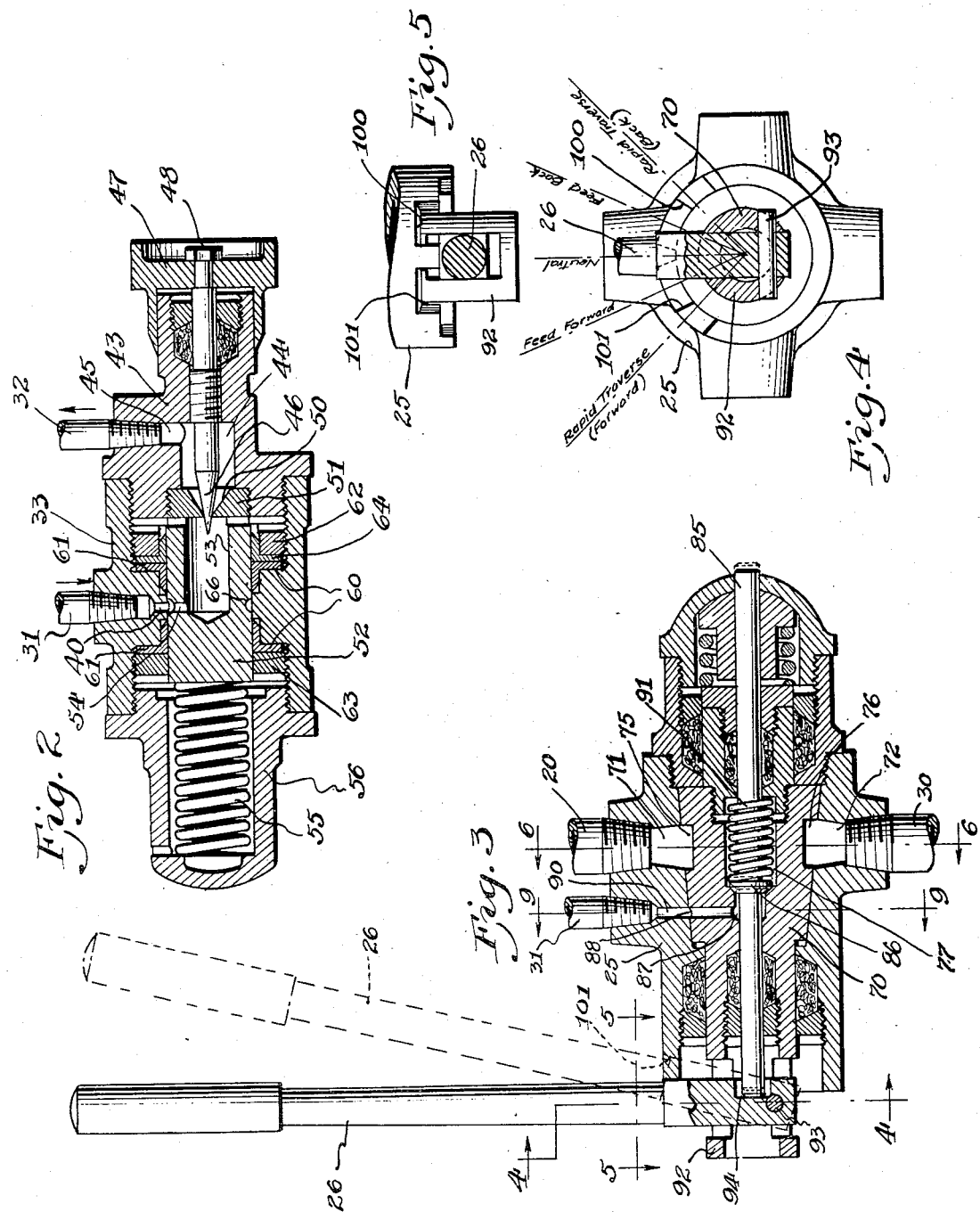

Dec. 29, 1942.   C. M. CONRADSON   2,306,379
HYDRAULIC POWER SYSTEM
Original Filed March 12, 1930   3 Sheets-Sheet 3
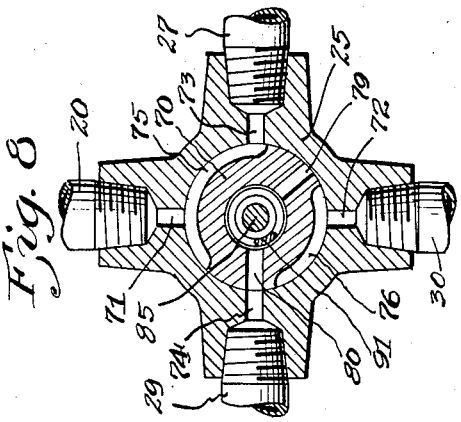
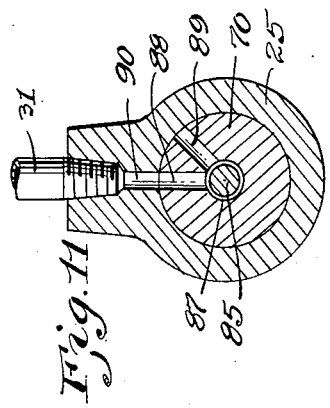
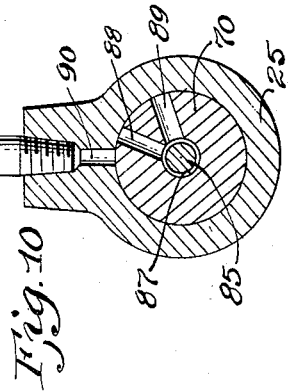
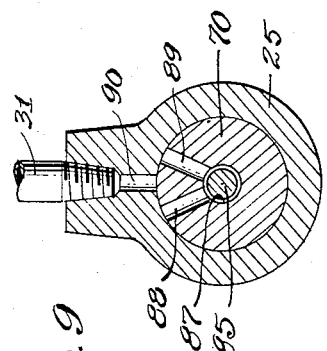
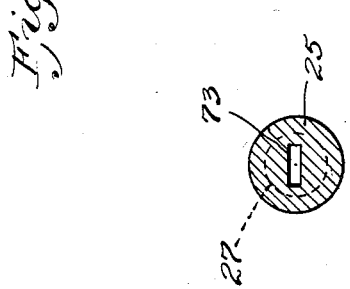
INVENTOR.
Conrad M. Conradson
BY
Barnes, Kisselle, Laughlin & Rauch
ATTORNEYS Patented Dec. 29, 1942

2,306,379

UNITED STATES PATENT OFFICE 2,306,379

HYDRAULIC POWER SYSTEM

Conrad M. Conradson, Detroit, Mich.; Frederick R. Walter, administrator of said Conrad M. Conradson, deceased, assignor, by mesne assignments, to Oscar Christianson, Madison, Wis., as trustee Original application March 12, 1930, Serial No. 435,210, now Patent No. 2,166,940, dated July 25, 1939. Divided and this application March 20, 1939, Serial No. 262,928

5 Claims. (Cl. 60—97)

My invention relates to improvements in hydraulic power transmitting systems.

This application is a division of my copending application, Serial No. 435,210, filed March 12, 1930, and issued as Patent No. 2,166,940, dated July 25, 1939.

The primary object of my invention is to provide means whereby the flow of a power liquid, such as oil, through a driven mechanism, or motor, may have its pressure and volume regulated in accordance with speed and power requirements.

More specifically stated, my object is to provide a hydraulic system in which the pressure drop of the liquid employed for power purposes may be controlled by a pressure regulating valve, and its volume controlled by a variable orifice escape valve, the organization being such that the rate of flow may be exactly predetermined in accordance with established engineering formulae for determining the rate of discharge through an aperture under a given head. My invention contemplates the use of hydraulic motors of any type, with associated supply and exhaust ducts, and any ordinary manually adjustable valve mechanism controlling the flow of the liquid in either the supply or the exhaust duct, but in addition thereto I employ a reducing valve and an associated escape valve having an orifice of variable capacity through which the rate of flow is determined by the pressure head established by the pressure regulator, thus making possible an exact control of the speed and power of a hydraulic motor.

Further objects of my invention are to devise improved valve mechanism and pressure and volume regulating mechanism suitable for accomplishing the objects above set forth; to provide means for accurately regulating the viscosity of the liquid in the system; to provide means whereby the liquid may be circulated under a pressure and in a volume on the high pressure side of the system, considerably in excess of the highest motor requirements and by-passed through motors to a low pressure or return main or delivered through a pressure regulator to a return main at the end of the supply main in a manner to permit continuous circulation regardless of the number of motors in use; to provide improved means for utilizing hydraulic power in a manner similar to that in which electrical power may be used, but with a greater range of power and speed in the individual units, to drive carriages, rotate turrets, actuate tools in quick and slow movements, operate hydraulic jacks and presses, and otherwise satisfy the requirements of a modern machine shop for varied intermittent and continuous operations suitable to be performed under hydraulic power.

In the drawings:

Fig. 1 is a diagrammatic view of a portion of a hydraulic system embodying my invention, showing the central power supply station and two machines connected to receive power therefrom.

Fig. 2 is a longitudinal sectional view of one of the pressure regulators employed in association with the valve mechanisms 25 conveniently illustrated in Fig. 1 and used to obtain accurately controlled motor speeds.

Fig. 3 is a central vertical longitudinal sectional view of manually adjustable motor controlling valve mechanisms, one of which is used to control deliveries to and from each motor and to also control delivery to one of the pressure regulators disclosed in Fig. 2.

Fig. 4 is a sectional view drawn to line 4—4 of Fig. 3.

Fig. 5 is a sectional view drawn to line 5—5 of Fig. 3.

Fig. 6 is a sectional view drawn to line 6—6 of Fig. 3, showing the valve in a neutral position.

Figs. 7 and 8 are similar views showing, respectively, the valve in rapid traverse and tool feed controlling position.

Figs. 9, 10 and 11 are sectional views taken respectively on the lines 9—9 of Fig. 3 to show another portion of the valve in the same positions of rotative adjustment in which it is illustrated in Figs. 6, 7 and 8.

Fig. 12 is a fragmentary sectional view drawn to line 12—12 of Fig. 6, and illustrating the port 73 as seen from the inner face of the valve chamber.

Fig. 13 is a perspective view illustrating conventionally the means for regulating the temperature of the power liquid to maintain uniform viscosity.

In the diagram shown in Fig. 1, power liquid is drawn from a reservoir 10 through a valved pipe or duct 11 to the suction side of the pump 12, the outlet 13 of which is connected to an accumulator 14.

From the accumulator, the liquid is delivered to a supply main 15 which conveys it to various machines and machine parts to be driven by hydraulic power. At its outer end this pipe 15 may be provided with an ordinary spring actuated check valve 16, which will serve as a safety valve to open under excess pressure and allow the liquid to enter a return pipe 17 which reconveys it to the reservoir 10.

At various points along the line of the main 15 branch ducts 20—21 are employed to deliver the power liquid to hydraulic motors 22—23, such delivery being in each case regulated by suitable manually controlled valve mechanism, the casings 25 of which clearly appear in Fig. 1.

One of the valve mechanisms 25 indicated in Fig. 1, and hereinafter more specifically described, is employed to regulate both the delivery to and the exhaust from, a motor 22, which has a reciprocatory piston 28 to be driven by the liquid. In one position of the controlling lever 26, the valves are adjusted so that the liquid passes freely to one end of the motor cylinder 22 through a pipe 27 and exhausts from the other end through the pipe 29, and one of the valve ports, to pipes 30 and 32, and thence to the return or low pressure main 17. In another position of lever adjustment, the exhaust (and the speed of the motor), is additionally controlled by cutting off deliveries through pipe 30 and directing the liquid through a pipe 31 connected with the casing member 33 of an associated pressure and volume regulator, the structure and mode of operation of which is hereinafter described.

The motor indicated at 23 may be assumed to be a rotary hydraulic motor such, for example, as a gear motor. But further description of the motors is deemed unnecessary since the structural features of the motors form no part of the invention and means for controlling the speed of operation will be the same regardless of the type of motor used. It may be assumed, however, that the motor 22 may be employed to reciprocate a boring bar 37 or any other tool carried by the turret 38 and it may also be assumed that the motor 23 may be employed to operate a drill or any other tool revoluble about a vertical axis regardless of whether such tool does or does not reciprocate vertically, as hereinafter set forth in the detailed description thereof, and each of the valve mechanisms 25 (Figs. 3, 6 and 9) has a neutral, i. e., a fully closed position, so that when adjusted to such position by the lever 26 no liquid will be delivered to the associated motor. However, the pump 12 may, if desired, be continuously driven by its motor 39 or from any other suitable source of power, whereby hydraulic power will be continuously available to any machine connected with the main 15.

In order that the means for controlling the operations of the motors may be clearly understood, the structure of the regulator at 33 will now be described, after which the structure of the valve mechanism will be set forth in detail and the cooperation therewith of this pressure and volume regulator will be explained.

The structure of the regulator at 33 is clearly shown in Fig. 2.

The cylindrical casing member 33 has a radial inlet port 40 with which the pipe 31 communicates. Into one end of this casing member 33 a head 43 is screwed, which has an outlet cavity 44 in communication with the pipe 32 through a port 45. The head 43 carries a needle valve 46, the stem of which is threaded axially into the head at one end of the cavity 44 and has its outer end keyed to a rotatable cap 47 and secured thereto by a nut 48. The needle valve 46 seats in a conical port 50, preferably formed in a nut 51 which is screwed into the inner end of the head 43 and forms the inner end of the cavity 44.

A cylindrical slide valve 52 is mounted within the casing member 33 and the end facing the outlet port 50 is provided with an axial bore 53, which, with the space between this valve and the head 43, forms a pressure accumulating cavity.

At the inner end of the bore 53 there is a radially extending port 54 in a position for normal registry with the inlet port 40. A coiled compression spring 55 is socketed in the cap 56 and tends to urge the slide valve 52 in the direction of the outlet port 50, but the pressure of the liquid admitted through the registering inlet ports 41 and 54 tends to urge the valve 52 in the opposite direction. When this pressure exceeds that exerted by the spring 55, the valve 52 will progressively close the port 41 until the flow of liquid through this port balances the out-flow permitted by the needle valve.

Therefore, the needle valve may be adjusted to precisely regulate the rate of liquid delivery, since the flow of the liquid through an aperture of a given capacity and under a given pressure will be equal at all times unless there is a change in viscosity, in which event a readjustment of the needle valve would be required. However, my invention includes means for maintaining a uniform viscosity as will be hereinafter explained.

To facilitate assembly, suitable packing rings 60 are seated against the shoulders formed by a central inwardly projecting portion 61 of the casing member 33. The end portions of the casing member are threaded internally to receive the packing nuts 62 and 63 and on the outlet side, oppositely faced packing rings 60 and 64 are preferably employed. After these parts have been assembled a head 43 and cap 56 are screwed into the respective ends of the casing 33 to complete the assembly.

Unless means are provided by key or otherwise to prevent the slide valve 52 from rotating, this valve should have an annular groove 66 in registry with the port 54 whereby the liquid may enter the port 54 from the port 40, regardless of whether or not the ports 41 and 54 are radially aligned. The rate of flow through the port 40 will be proportional to the area of its own outlet as determined by longitudinal movements of the slide valve 52. The relative capacity of this opening as compared with that controlled by the needle valve will, of course, determine the degree of pressure that may be built up within the cavity 53 and thus make possible volumetric control by means of the needle valve as long as excess pressure is maintained in the tank 14, since the pressure at the needle valve is regulated by its associated pressure regulating valve 52.

As above explained, the use of the pressure and volume regulator is dependent upon a specific adjustment of the controlling lever 26, whereby the main valve mechanism may be utilized to connect up the regulator at 33 and shut off direct delivery of the exhaust from the motor through the pipe 30. This main valve mechanism will now be described.

The casing member 25 is ported in four directions in the plane represented by the line 6—6 in Fig. 3. Each of these ports is preferably in the form of a slot, rectangular in cross section and extending longitudinally of the casing, whereby a uniform rate of shut-off may be obtained by a rotary plug valve 70 within the casing. It will be obvious that the effective area of a rectilinear port will be exactly proportioned to the movement of the valve across the port from one of its side walls, whereas if the port is circular the area cut off by any given movement of the valve progressively increases until the valve crosses a center line of the port parallel with the advancing edge of the valve, after which the rate of shut-off for any given degree of valve rotation will progressively decrease. In the construction shown, the port 71 is the inlet port, this being connected with one of the branch pipes 20 or 21 shown in Fig. 1. The port 72, directly opposite the port 71, is the direct flow outlet port connected with the pipe 30, and associated with the return main 17. The two side ports 73 and 74 are connected to the motor and are adapted to serve as either supply or exhaust ports, dependent in any given instance on the direction of the motor operation.

The rotary valve 70 is preferably of the taper plug type and as clearly appears in Figs. 6, 7 and 8, it has oppositely disposed arcuate cavities 75 and 76 in its peripheral surface and it is also provided with an axial cavity 77 from which two radial ports 79 and 80 extend to the periphery.

In Fig. 3 it will be observed that a rod 85 extends axially through the cavity 77 in the rotary valve 70 and is provided with an annulus which serves as a check valve 86 and normally separates this cavity 77 from a cavity 87 of smaller diameter in communication with two radial ports 88 and 89, one of which appears in Fig. 3, but both of which are shown in Figs. 9, 10 and 11. These ports 88 and 89 are adapted for independent registry with a port 90 in communication with the pressure regulator inlet through the pipe 31. A coiled compression spring 91 tends to hold the valve 86 to its seat on the tapered shoulder formed at the junction of the cavity 77 with the cavity 87, whereby delivery of liquid through the ports 88, 90 and pipe 31 is normally prevented.

The stem 92 of the rotary valve 70 has its projecting end slotted to receive the working end of the lever 26 and the lever is pivoted to the stem by means of a cross pin 93 located on the opposite side of the valve axis from that occupied by the lever handle. The lever has its inner face recessed at 94 to receive the end of the rod 85 and when the lever is swung upon the pivot pin 93, this rod 85 may be actuated to open the check valve 86. When the lever is swung rotatively the rotary valve 70 may be adjusted in the manner now to be described.

As shown in Figs. 6 and 9, the cavity 75 is in registry with the inlet port 71 but with no other port, and the cavity 76 is in registry with the outlet 72 but with no other port. The radial ports 79 and 80, 88 and 89, are closed at their outer ends. With the valve in this position no liquid can pass through the casing. This is the normal or neutral position.

Assuming the valve 70, controlling the deliveries to the motor 22 (Fig. 1), to be in the neutral position in which it is illustrated in Figs. 6 and 9, it is obvious that if it is rotated in a clockwise movement to the position in which it is indicated in Figs. 7 and 10, liquid from the main 15 will be received through the pipe 20 and delivered through the valve cavity 75 and pipe 27 to the right hand end of the motor cylinder 22. Liquid from the left hand end of the cylinder 22 will simultaneously exhaust freely through the pipe 29, valve cavity 76, and pipes 30 and 32 to the return main 17. In this position of the valve 70, the piston 28 of the motor 22 will be moved rapidly to the left, producing rapid traverse of the carriage 36 and tool 37, the only limiting factor being the capacity of the ports and connecting pipes unless the valve is carefully adjusted to only partially open the ports. Should more than one of the valves 70 be shifted to operate a plurality of motors simultaneously on rapid traverse strokes, they may not necessarily operate at equal speeds, but the motor having the lightest load will tend to take the greater portion of fluid delivered from accumulator 14. However, where the accumulator is designed with sufficient capacity, this tendency can be minimized since the faster a given motor consumes fluid the greater is the pressure drop in the pipes and connections leading to the motor, the pressure drop increasing as the square of the fluid velocity. Since the rapid traverse stroke is in most cases used for bringing the tool into position for beginning of actual work and requires only a small interval of time in any case, there is little necessity of insuring equalized speeds or even of simultaneous movement of a plurality of motors on the rapid traverse stroke.

But as the tool approaches the work, the lever 16 may be reversely actuated to rotate the valve in the opposite direction (counter-clockwise) until the valve reaches the position in which it is illustrated in Figs. 8 and 11. In that position, its arcuate cavity 75 will still connect the ports 71 and 73 to continue the delivery of liquid to the right hand end of the cylinder 22.

But it will be observed in Fig. 8 that cavity 76 will then be in registry only with port 72. The radial port 80 will be in registry with the port 74 and the pipe 29 will therefore be in communication with the central or axial valve cavity 77 from which liquid cannot escape until the lever 16 is swung upon the pivotal axis 93 in a plane at right angles to its above described movement of rotation, the lever being then brought to the dotted line position indicated in Fig. 3. This lever movement actuates rod 85, opens the valve 86, and allows the liquid to flow from the cavity 77 into the extension cavity 87 and thence through the registering ports 88 and 90 and pipe 31 to the pressure and volume regulator, where its pressure is regulated by the slide valve 52, and its rate of flow determined by the needle valve 46. With a rate of flow thus predetermined by the setting of the needle valve it reaches the return duct 32 through the port 45.

By thus controlling the volume of liquid returned from the exhaust side of the piston of motor 22, the motion of the latter may be accurately controlled by adjustment of the needle valve in accordance with the tool feeding requirements of any tool carried by the turret. It will be seen that during the feeding movement of one motor one or more of the other motors may be actuated on feeding strokes simultaneously, and all possible variations in load on one motor will have no effect on any other motor. This is true right up to the point where the total rate of fluid consumption of all the motors is just equal to the total delivery capacity of the source. In other words, each regulator valve acts, when the load on a given motor falls off, to impose additional resistance on the exhaust line which in turn keeps the pressure in the supply duct from falling off at all.

For retraction of the tool the lever 26 will first be swung to its neutral or upright position, thereby stopping the motor by closing the valve 86. By then swinging the lever to move the valve in a counter-clockwise direction from the position in which it is illustrated in Fig. 7, its port 75 may be brought into simultaneous registry with the ports 71 and 74, thus reversing the flow of liquid from port 71 to the motor by delivering it through the ports 74 and pipe 29 to the left hand of the cylinder 22. In this position of the valve it is obvious that the liquid will then be allowed to freely pass from the right-hand end of the motor through the pipe 27, port 73, and valve cavity 76 to port 72 and the return ducts or pipes 30 and 32 which lead to the return main 17.

If it is desired to limit the speed during the reverse operation of the motor 22, i. e., the movement of its piston to the right as illustrated in Fig. 1, this can be done by stopping the movement of the lever 16 from neutral position in the counter-clockwise direction when the valve port 79 is brought into registry with the casing port 73 and then moving the lever to an inclined position similar to that in which it is indicated by dotted lines in Fig. 3, whereupon liquid will be permitted to return through the pipe 27, ports 73 and 79, the axial cavities 77, 87, 89 and 90 and through the pressure and volume regulator (Fig. 2).

The end of the valve casing 25 is notched at 100 and 101 (Fig. 4) to receive the lever at the intermediate stages of its rotative stroke when one of the ports 79 or 80 of the rotary valve 70 is in registry with its associated casing port 73 or 74. It is necessary that the lever be adjusted in one of these positions before it can be swung to an inclined position as indicated by dotted lines in Fig. 3 and thus open valve 86 to connect up the pressure and volume regulator for control of the speed of the motor.

From the foregoing description it will be obvious that like valve mechanisms and pressure volume regulators may be employed to control the operation of a hydraulic motor of any type, since means are provided for controlling delivery of the hydraulic fluid in volume and at a pressure to satisfy full speed requirements of the motor in either direction and to exactly control the speed of the motor by a pressure and volume regulator of the type described.

If a rotary motor is employed as indicated at 23 in Fig. 1, the power liquid may be delivered to the motor through the pipe 27a and exhausted through the pipe 29a exactly as above described with reference to the pipes 27 and 29 associated with the motor 22. Also the flow of liquid through these pipes 27a and 29a may be reversed to reverse the operation of the motor 23 in the same manner that the operation of motor 22 is reversed as above described.

It may be desirable to maintain a uniform viscosity of the power liquid in order to avoid the necessity of changing the adjustment of the needle value 46 in accordance with changing viscosity due to changes in temperature. If there is no change in viscosity or density the liquid under a given pressure in the cavity 53 of the pressure and flow regulator will at all times have an exactly controlled rate of flow past the needle valve 46 in any given adjustment of that valve. The density will not ordinarily vary where oil is used as the hydraulic agent and viscosity of the liquid will be uniform if a uniform temperature is maintained. This can be easily accomplished by employing heating and cooling means through which the liquid may be alternatively directed by means of a thermostatically controlled valve which is adapted to direct the liquid through the heater when the temperature of the liquid is below the desired degree, and to direct it through a radiator or cooler when the temperature is above the desired degree. This means for controlling the temperature and correspondingly controlling the viscosity is illustrated most clearly in the conventional diagram, Fig. 13, and is described as follows.

Where temperature control is desired, the valve at 105 in the pipe 11 may be closed and the liquid supplied to the pump through the pipe 106, this pipe extending through an electrical heating chamber 104. A thermostat at 102 may be employed to control an electrical circuit of the heater through the lead 103 when the temperature of the oil falls below that predetermined by the setting of the thermostat.

If desired, or if conditions require, the thermostat may also be employed to control an electrical circuit through the coil of an electromagnetically operated valve at 108, whereby, when the temperature rises above the desired limit the valve at 108 may be automatically adjusted to by-pass the power liquid through a radiator indicated at 109. A valve at 110 may be employed to shut off the flow of the power liquid through pipe 106 when the valve at 105 is open.

The use of thermostats to alternately control the operation of electro-heaters and electromagnets is well understood and detailed explanation and description is deemed unnecessary.

What I claim is:

1. In a hydraulic power system, the combination with supply and return mains, and means for circulating power liquid through the supply main under pressure and for rendering an excess of volume available, of a series of motors connected in parallel to receive power liquid from the supply main, and deliver it to the return main, valve mechanisms, each individually controlling delivery of power liquid to one of the motors, a volume controlling valve associated with each of said valve mechanisms, and means for effecting a uniform pressure drop in the pressure head of the liquid passing through said volume controlling valve, each of said valve mechanisms being adapted in one position to control the flow of the power liquid to and from the associated motor independently of pressure and volume regulation, and in another position to direct such power liquid through the pressure and volume regulator, each motor receiving liquid at a constant rate under all conditions of load at such motor and at each other motor when the total liquid flow rate through all motors is substantially equal to the output rate of the circulating means.

2. In a hydraulic system of the type having a set of parallelly connected motors, a pressure regulator associated with each motor and having a valve affecting flow of motive liquid to the motor, a spring normally urging said valve to open position, said valve being urged toward closed position by pressure of the liquid at the outlet side thereof, and an adjustable device for restricting the outlet passage beyond the valve, whereby the speed of the motor may be automatically determined by said valve in co-operation with said restricting device to determine the rate of flow of the power liquid and thus maintain each motor in operation at its intended speed regardless of load variations at any other motor.

3. In a motor operating hydraulic system, a source of power liquid under constant pressure, a plurality of motors each having a supply duct connected to the source and an exhaust duct, valve mechanisms hydraulically connected with said ducts each individually controlling delivery of power liquid to and exhaust liquid from one of said motors, and regulator mechanisms individually associated with the valve mechanism and ducts of each motor serving to maintain the pressure in the supply duct of each motor against falling with a decrease in load on such motor comprising means forming an orifice adjustable to a predetermined size, and variable valve means associated therewith to maintain a predetermined drop across said orifice and responsive to pressures in one of the motor ducts to provide resistance in said duct to balance decreases in load on the motor controlled, whereby each motor will be maintained in operation when the load on another motor has decreased to a point otherwise permitting such other motor to accept liquid at a rate equal to the combined rates of liquid flow to both motors at full load.

4. In a motor operating hydraulic system, a source of power liquid under constant pressure, a plurality of motors each having a supply duct connected to the source and an exhaust duct, and regulator mechanisms individually associated with one of the ducts of each motor serving to maintain the pressure in the supply duct of each motor against falling with a decrease in load on such motor comprising means forming an orifice adjustable to a predetermined size, and variable valve means associated therewith to maintain a predetermined drop across said orifice and responsive to pressures in one of the motor ducts to provide resistance in said duct to balance decreases in load on the motor controlled and thereby prevent the controlled motor from accepting any portion of the liquid normally delivered by the source to another motor which at the time is fully loaded.

5. In a motor operating hydraulic system, a source of power liquid under constant pressure, a plurality of motors each having a supply duct connected to the source and an exhaust duct, valve mechanisms hydraulically connected with said ducts each individually controlling delivery of power liquid to and exhaust liquid from one of said motors, and regulator mechanisms individually associated with the valve mechanism and ducts of each motor serving to maintain the pressure in the supply duct of each motor against falling with a decrease in load on said motor, said regulator mechanisms comprising a regulator valve, a spring normally urging said valve to open position, said valve being urged toward closed position by the pressure of the liquid at the outlet side thereof, and an adjustable device for restricting the passage beyond the valve whereby a predetermined pressure drop is maintained across said restricting device, said regulator valve being responsive to pressures in one of the motor ducts to provide resistance in said duct to balance decreases in load on the motor controlled and thereby maintain the full source delivery available to operate another fully loaded motor under conditions where the total source delivery is utilized to operate all the motors at full load.

CONRAD M. CONRADSON.